United States Patent Office 3,486,980
Patented Dec. 30, 1969

3,486,980
PROCESS FOR PRODUCING 5'-INOSINIC ACID
Katsunobu Tanaka and Kazuo Kimura, Machida-shi, and Keiichi Inuzuka and Yoh Tokoro, Tokyo, Japan, assignors to Kyowa Hakko Kogyo Co., Ltd., Tokyo, Japan
No Drawing. Filed Aug. 24, 1966, Ser. No. 574,559
Claims priority, application Japan, Aug. 30, 1965, 40/52,570
Int. Cl. C12d 1/02; C12b 1/00
U.S. Cl. 195—28                    6 Claims

ABSTRACT OF THE DISCLOSURE

Large yields (about 12.0 to 25.0 mg./ml.) of 5'-inosinic acid are obtained by culturing a mixed culture of (a) an adenine-requiring mutant microorganism capable of producing 5'-inosinic acid and (b) its parent strain in an aqueous nutrient medium under aerobic conditions, the amount of mutant to parent in the mixed culture preferably being greater than 1:1 by weight. The hypoxanthine normally formed as a by-product is converted into 5'-inosinic acid as a result, thereby resulting in the increased yields. *Brevibacterium ammoniagenes* and *Corynebacterium glutamicum* are the preferred microorganisms.

---

This invention relates to a process of producing 5'-inosinic acid. More particularly, it relates to a process for the production of 5'-inosinic acid by fermentation. Even more particularly, the invention relates to a process for the production of 5'-inosinic acid by fermentation in the presence of certain combinations of microorganisms.

5'-Inosinic acid, which is hypoxanthine riboside-5-phosphoric acid, is a compound well known in the art. It has been prepared in the prior art from meat extract, from muscle by the enzymatic deamination of muscle adenylic acid, and by the hydrolysis of inosine triphosphate. Recently, research on processes for producing 5'-inosinic acid have been carried out since this compound has important utility in, for example, the foodstuff industry, as well as in other fields. These fermentation processes involve producing hypoxanthine, inosine or 5'-inosinic acid in a culture medium by culturing various kinds of microorganisms or their mutant strains.

Among the fermentation processes which have been employed, the process of accumulating 5'-inosinic acid directly in the culture medium by employing an adenine-requiring mutant strain is the best process from the industrial point of view. Microorganisms which have been found to be particularly efficacious in this type of process since they have a strong ability to accumulate 5'-inosinic acid are those belonging to the genera Corynebacterium and Brevibacterium. However, culturing such adenine-requiring mutant strains of microorganisms which have the capability of producing inosinic acid involves the disadvantages that long periods of time are required for the fermentation and that hypoxanthine is produced in the culture medium as a by-product in addition to the desired 5'-inosinic acid. These disadvantages are clearly undesirable for an industrial scale process.

One of the objects of the present invention is to provide an improved process for the production of 5'-inosinic acid which overcomes the disadvantages and deficiencies of the prior art methods.

Another object of the present invention is to provide a process for producing 5'-inosinic acid by fermentation which may be carried out in an efficacious and simple manner.

A further object of the invention is to provide a process for producing 5'-inosinic acid by fermentation which gives the product in good yield and in a form whereby it may be easily recovered in high purity.

A still further object of the invention is to provide a process for producing 5'-inosinic acid by fermentation which may be carried out advantageously on an industrial scale at low cost to give a high yield of product.

Yet another object of the present invention is to provide a process for producing 5'-inosinic acid by fermentation which shortens the amount of time required for culturing and suppresses the amount of by-product hypoxanthine which is produced while increasing the amount of 5'-inosinic acid which is produced.

These and other objects and advantages of the present invention will become apparent to those skilled in the art from a consideration of the following specification and claims.

In accordance with the present invention, it has been found that remarkably large quantities of 5'-inosinic acid are accumulated in the fermentation liquor and may be recovered therefrom if fermentation or culturing is carried out with an adenine-requiring strain which has the ability to produce 5'-inosinic acid in mixture with the parent strain thereof. In this way, the necessary fermentation time is abbreviated. Moreover, the by-product hypoxanthine normally produced is obtained as 5'-inosinic acid. Consequently, the production of 5'-inosinic acid is greatly accelerated, the amount of hypoxanthine formed as a by-product is greatly reduced and a very large amount of 5'-inosinic acid is accumulated in a brief time.

Strains of microorganisms which conform to the aforesaid objects and provide effective mixed cultures in connection therewith are quite numerous. However, *Brevibacterium ammoniagenes* and *Corynebacterium glutamicum* (*Micrococcus glutamicus*: Japanese patent publication 8698/1957) have been found to be particularly effective in producing 5'-inosinic acid in large amounts in accordance with the present invention.

Thus, for example, if an adenine-requiring mutant strain of *Brevibacterium ammoniagenes* ATCC 6872 is cultured under appropriate culturing conditions, a conspicuous amount of 5'-inosinic acid is accumulated in the culture medium, while, simultaneously, hypoxanthine in the amount of 20% to 30% by weight, in proportion to the amount of 5'-inosinic acid, is secondarily produced as a by-product. On the other hand, if the parent *Brevibacterium ammoniagenese* ATCC 6872 strain is cultured in mixture with the aforesaid mutant strain, the hypoxanthine normally formed as a by-product is entirely converted into 5'-inosinic acid and, moreover, the production of 5'-inosinic acid by the mutant strain is remarkably accelerated. Hence, an even more conspicuous amount of 5'-inosinic acid is produced in the culture medium in a shorter time.

The relationship between the ratio of the amount of parent strain to mutant strain employed and the amount of 5'-inosinic acid produced in the culture medium as a result thereof is shown in Table 1. The parent strain employed was *Brevibacterium ammoniagenes* ATCC 6872; the mutant strain was the adenine-requiring strain *Brevibacterium ammoniagenes* ATCC 15187.

TABLE 1

| Mixture ratio (Initial step of fermentation) Parent strain: Adenine-requiring strain | Amount of strain cells (mg./ml.) | Amount of 5'-inosinic acid produced (mg./ml.) | Amount of hypo-xanthine produced (mg./ml.) | Fermentation time (hours) |
|---|---|---|---|---|
| 100:0 | 22.0 | Trace | Trace | ---- |
| 50:50 | 24.3 | 12.0 | Trace | 56 |
| 30:70 | 22.2 | 15.0 | Trace | 60 |
| 20:80 | 24.9 | 25.0 | Trace | 72 |
| 10:90 | 22.3 | 20.3 | 0.1 | 72 |
| 0:100 | 23.2 | 10.2 | 0.2 | 86 |

The experimental method used in obtaining the results shown in Table 1 was carried out in accordance with the description recited in Example 1 hereinbelow.

It can be seen from Table 1 that the effect of using a mixed culture in accordance with the present invention results in that the hypoxanthine normally secondarily produced in such fermentation processes is not only converted into 5'-inosinic acid but also that the fermentation time is remarkably abbreviated. Thus, the formation of 5'-inosinic acid by means of the adenine-requiring mutant strain is accelerated to give a higher yield thereof in a shorter time than has been possible with the prior art processes. The resultant 5'-inosinic acid may then be recovered from the fermentation liquor by conventional means, such as ion exchange resin treatment, extraction with solvents, precipitation with metallic salts, chromatography and the like.

The above-mentioned microorganisms, such as *Corynebacterium glutamicum* and *Brevibacterium ammoniagenes*, may be mutated morphologically or physiologically during the storage thereof by the employment of various artificial conditions, such as treatment of the appropriate parent strains with ultraviolet light. On the other hand, such mutants can be isolated from natural soils. It should thus be clear to those skilled in the art that such mutant strains or natural variants can be used in the process of the present invention so long as they have the property of accumulating a large amount of 5'-inosinic acid in a mixed culture thereof with their respective parent species strains.

Either a synthetic culture medium or a natural nutrient medium is suitable in the fermentation process of the present invention as long as it contains the essential nutrients for the growth of the strains employed. Such nutrients are well known in the art and include substances such as a carbon source, a nitrogen source, inorganic compounds and the like which are utilized by the micro-organisms employed in appropriate amounts. Thus, as a carbon source, there may be mentioned, by way of example, carbohydrates such as glucose, fructose, maltose, sucrose, dextrose, starch, starch hydrolysate, etc., or any other suitable carbon source. The carbon source may be one of these substances or a mixture of two or more. As a nitrogen source, various kinds of inorganic or organic salts or compounds, such as urea or ammonium salts such as ammonium chloride, ammonium sulfate, ammonium nitrate, ammonium phosphate, etc. or natural substances containing nitrogen, such as cornsteep liquor, yeast extract, meat extract, peptone, fish meal, casein hydrolysates, fish solubles, rice bran extract, etc. may be employed. The nitrogen source may also be one of these substances or more than one in combination. Inorganic compounds which may be added to the culture medium include, for example, magnesium sulfate, sodium phosphate, potassium dihydrogen phosphate, potassium monohydrogen phosphate, as well as other appropriate inorganic salts of magnesium, potassium and sodium, etc. In addition, small amounts of nutrients which are necessarily assimilated by the microorganisms employed in order for them to maintain and obtain a sufficient growth are also used. These include substances such as biotin, β-alanine, cystine and auto-digesting liquors of yeasts.

The adenine-requiring strain capable of producing 5'-inosinic acid and its parent strain or its mutational strain are inoculated into the nutrient culture medium employed. The two strains separately cultured in advance can be simultaneously inoculated into the medium or they can be separately inoculated thereinto at different times. Alternatively, the parent and the mutant strain may be seed-cultured in mixture and inoculated into the culture medium. In all of these cases, the ratio of the strains inoculated into the culture medium may be changed appropriately to some extent. The ratio of microorganisms in the fermentation liquor is, however, preferably maintained so that the amount of microorganism which produces the 5'-inosinic acid is present in an amount greater than the amount of parent strain.

Fermentation or culturing is conducted under aerobic conditions, such as aerobic shaking of the culture or with aerating agitation of a submerged culture, at a temperature of about 30° to 38° C. and at a pH of about 6.0 to 8.5. The pH may be maintained within this range by the addition of aqueous ammonia to the medium. The time of culturing is appropriately controlled so as to obtain the maximum amount of 5'-inosinic acid. Generally, fermentation is carried out for from two to eight days. The particular conditions of fermentation to be employed may be determined by various factors such as the particular type of culture medium, the particular mode of culturing and the amount of aeration utilized. With optimum conditions, large amounts of 5'-inosinic acid are accumulated in the culture liquor and, as noted above, may be recovered therefrom advantageously by removing the strain cells from the fermentation liquor and then, the example, utilizing an ion exchange resin treatment.

The following examples are given merely as illustrative of the present invention and are not to be considered as limiting. Unless otherwise noted, the percentages therein are by weight.

EXAMPLE 1

*Brevibacterium ammoniagenes* ATCC 15187, an adenine-requiring mutant strain capable of producing 5'-inosinic acid, is used as the seed strain. This strain is cultured with aerobic shaking in a 2-liter conical flask containing 300 ml. of a seed culture medium consisting of 4.0% of glucose, 1.0% of yeast extract, 0.25% of NaCl and 0.2% of urea at a temperature of 32° C. for 24 hours. The seed culture medium has a pH of 7.2.

Simultaneously, *Brevibacterium ammoniagenes* ATCC 6872, the parent strain of said *Brevibacterium ammoniagenes* ATCC 15187, is cultured with aerobic shaking in a seed culture medium having the same composition as described above for 24 hours.

300 ml. of the said mutant seed strain and 40 ml. of the said seed parent strain are inoculated into a 5 liter jar fermentor containing 3 liters of the following fermentation medium composition:

| | |
|---|---|
| Glucose, 10% | β-alanine, 15 mg./l. |
| $KH_2PO_4$, 1.0% | Ehrlich meat extract, 1.0% |
| $K_2HPO_4$, 1.0% | $MgSO_4 \cdot 7H_2O$, 1.0% |
| $CaCl_2 \cdot 2H_2O$, 0.01% | Vitamin $B_1$, 5 mg./l. |
| $ZnSO_4 \cdot 7H_2O$, 1 mg./l. | Urea, 0.2% |
| $FeSO_4 \cdot 7H_2O$, 20 mg./l. | Adenine, 30 mg./l. |
| L-cystine, 20 mg./l. | Guanine, 20 mg./l. |
| Biotin, 30 γ/l. | |

The pH of this fermentation medium is 7.5.

Culturing is carried out with agitation of 600 r.p.m. with aeration at the rate of 3 liters of sterilized air per minute at a temperature of 35° C. The pH of the fermentation liquor during culturing is controlled within the range of 6.6 to 7.2 by the addition of aqueous ammonia thereto. After 72 hours of continuous culturing, 25 mg./ml. of 5'-inosinic acid is found to be accumulated in the culture liquor.

Two liters of the filtrate obtained after the removal of the cell bodies of the mutant and parent strains employed from the fermentation liquor is adjusted to a pH of 1.4 by the addition of hydrochloric acid thereto. The filtrate is then run through an ion exchange resin column containing Diaion SK #1 (H type) ion exchange resin. Distilled water is then fed into the column and the resultant eluent containing 5'-inosinic acid obtained initially is mixed together with the said filtrate. The resultant mixture is then adjusted to a pH of 7.2 by the addition of sodium hydroxide thereto. This resultant mixture is then concentrated under a reduced pressure and cooled. As a result, 35 grams of crystals of sodium inosinate is obtained.

As a comparison, the same fermentation is carried out with the same fermentation medium composition and culturing conditions as above but wherein the parent strain *Brevibacterium ammoniagenes* ATCC 6872 is omitted so that only the mutant strain *Brevibacterium ammoniagenes* ATCC 15187 is utilized therein. After 72 hours of culturing, 10 mg./ml. of 5'-inosinic acid and 2.8 mg./ml. of hypoxanthine are accumulated in the fermentation liquor.

EXAMPLE 2

As the seed strain, the adenine-requiring strain *Corynebacterium glutamicum* ATCC 14995 (*Micrococcus glutamicus*—Japanese patent publication 8,698/1957), which is capable of producing 5'-inosinic acid, together with its parent strain *Corynebacterium glutamicum* No. 534 ATCC 13032 are employed as a mixed culture. Culturing is carried out therewith as described in Example 1 using the same fermentation medium composition and conditions of culturing. After 60 hours of continuous culturing, 15 mg./ml. of 5'-inosinic acid is obtained.

When culturing is carried out with the mutant strain *Corynebacterium glutamicum* ATCC 14995 alone under the same conditions of culturing, only 7.5 mg./ml. of 5'-inosinic acid is obtained.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing 5'-inosinic acid by fermentation which comprises culturing a mixed culture of an adenine-requiring strain of *Corynebacterium glutamicum* which is capable of producing 5'-inosinic acid and the hypoxanthine-producing parent strain thereof, the ratio by weight of said adenine-requiring strain to parent strain in said mixed culture ranging from greater than 1:1, up to 9:1 in an aqueous nutrient medium containing adenine under aerobic conditions, substantially all of the hypoxanthine produced during culturing being converted into 5'-inosinic acid, accumulating 5'-inosinic acid in the resultant culture liquor, and recovering the 5'-inosinic acid from said liquor.

2. The process of claim 1, wherein said adenine-requiring microorganism is *Corynebacterium glutamicum* ATCC 14995 and said parent strain is *Corynebacterium glutamicum* ATCC 13032.

3. The process of claim 1, wherein the ratio by weight of adenine-requiring microorganism to parent strain in said mixed culture is from 70:30 to 90:10.

4. A process for producing 5'-inosinic acid by fermentation which comprises culturing a mixed culture of an adenine-requiring strain of *Corynebacterium glutamicum* which is capable of producing 5'-inosinic acid and the hypoxanthine-producing parent strain thereof, the ratio by weight of said adenine-requiring strain to parent strain in said mixed culture ranging from greater than 1:1, up to 9:1, in an aqueous nutrient medium containing adenine under aerobic conditions at a temperature of from about 30° to 38° C. and a pH of from about 6.0 to 8.5, substantially all of the hypoxanthine-produced during culturing being converted into 5'-inosinic acid, accumulating 5'-inosinic acid in the resultant culture liquor, and recovering the 5'-inosinic acid from said liquor.

5. The process of claim 4, wherein said adenine-requiring microorganism is *Corynebacterium glutamicum* ATCC 14995 and said parent strain is *Corynebacterium glutamicum* ATCC 13032.

6. The process of claim 4, wherein the ratio by weight of adenine-requiring microorganism to parent strain in said mixed culture is from 70:30 to 90:10.

References Cited

UNITED STATES PATENTS 3,232,844 2/1966 Kinoshita et al.
3,389,058 11/1966 Kinoshita et al.

ALVIN E. TANENHOLTZ, Primary Examiner

U.S. Cl. B.R.
195—100, 111